United States Patent
Song et al.

(10) Patent No.: US 8,228,628 B2
(45) Date of Patent: Jul. 24, 2012

(54) DATA STORAGE DISK HAVING VARIABLE LOCATION SIGNAL AND DISK DRIVE USING THE DATA STORAGE DISK

(75) Inventors: Kum-Jung Song, Suwon-si (KR); Sang Hoon Chu, Suwon-si (KR)

(73) Assignee: Seagate Technology International, Grand Cayman (KY)

( * ) Notice: Subject to any disclaimer, the term of this patent is extended or adjusted under 35 U.S.C. 154(b) by 732 days.

(21) Appl. No.: 12/429,243

(22) Filed: Apr. 24, 2009

(65) Prior Publication Data

US 2009/0268338 A1 Oct. 29, 2009

(30) Foreign Application Priority Data

Apr. 28, 2008 (KR) .................. 10-2008-0039196

(51) Int. Cl.
*G11B 15/18* (2006.01)
(52) U.S. Cl. .................. 360/69; 360/78.04; 360/78.12

(58) Field of Classification Search .................. 360/69, 360/78.04, 78.09, 78.12, 78.14
See application file for complete search history.

(56) References Cited

U.S. PATENT DOCUMENTS

| | | | | |
|---|---|---|---|---|
| 5,859,742 | A | * | 1/1999 | Takaishi .................. 360/78.01 |
| 7,177,113 | B1 | * | 2/2007 | Semba et al. .............. 360/77.07 |
| 2004/0090693 | A1 | | 5/2004 | Zhang et al. |
| 2006/0171062 | A1 | * | 8/2006 | Hirano et al. .............. 360/78.05 |
| 2007/0002487 | A1 | | 1/2007 | Langlois et al. |

FOREIGN PATENT DOCUMENTS

| | | |
|---|---|---|
| JP | 2006139855 | 6/2006 |
| KR | 1020070024216 A | 3/2007 |

* cited by examiner

*Primary Examiner* — Kevin M Picardat
(74) *Attorney, Agent, or Firm* — Volentine & Whitt, PLLC

(57) ABSTRACT

A hard disk drive includes a magnetic head, at least one disk and a controller. A location signal is recorded on the at least one disk for determining a location of the magnetic head in relation to the at least one disk. The controller controls the location of the magnetic head based on the location signal decoded through the magnetic head. At least one of frequency and amplitude of the location signal is variable.

10 Claims, 6 Drawing Sheets

Off-track

DATA STORAGE DISK HAVING VARIABLE LOCATION SIGNAL AND DISK DRIVE USING THE DATA STORAGE DISK

PRIORITY CLAIM

A claim of priority is made to Korean Patent Application No. 10-2008-0039196, filed on Apr. 28, 2008, the subject matter of which is hereby incorporated by reference.

SUMMARY

Embodiments of the present invention relate to a data storage disk and disk drive, and more particularly, to a disk drive capable of precisely controlling location of an access device with respect to the data storage disk using location signals.

Disk storing devices, such as hard disk drives, are becoming smaller and more compact. Due to cost-saving pressures and trends toward higher integration in electronic products, disk storing devices must store 1.2 to 1.5 times the amount of data, while having less physical disk space. Regardless, disk storing devices must continue to satisfy stringent accuracy and reliability requirements, so that data is saved with little to no loss, for example, by precisely searching for and mapping defects existing in the disk storage medium.

Accordingly, the location of a decoder or access device, such as a magnetic head of a hard disk drive, is determined with respect to the disk. Location data may be provided by a location signal recorded on the disk, which includes multiple tracks, e.g., formed in concentric circles on the disk. The location signal includes track information, and is a specifically patterned signal between tracks used for recognizing location of the access device between tracks.

A conventional location signal generally indicates an actual cylinder value and detailed location information between each cylinder. A position index is used to represent exact location information between each cylinder, and generally includes 2 to 6 "bursts."

In a demodulation process for decoding the location information, the standard (size or phase) used to decode the location information is integral to precise location decoding. Generally, the accuracy of location control is directly proportional to the number of location signals. However, as the number of location signals increases, more disk space is used for the location information. Conversely, in order to save disk space, the number of location signals (and disk space used by these location signals) may be reduced, but fewer location signals result in less precision.

In a conventional disk storing device, each location signal has the same frequency and amplitude. Also, a conventional disk storing device records several location signals between adjacent tracks and determines location as a function of the interrelationships among these signals.

FIG. 1 is a schematic diagram showing a structure of a location signal in a conventional disk storing device. Referring to FIG. 1, a disk includes multiple tracks. The tracks may be divided into multiple sectors, and the sectors may be divided into a data sector and an information sector. The data sector stores actual data and the information sector, e.g., a servo sector of a hard disk drive, includes information for accessing to the data sector.

As illustrated in FIG. 1, there are multiple location signals in information sectors, indicated by representative location signals 20 and 30. An access device 10, e.g., a magnetic head of a hard disk drive, decodes the location of the access device 10 using at least two or more location signals 20 and 30.

The location signals 20 and 30 are recorded having fixed frequency and amplitude. Therefore, the frequency and amplitude of the location signals remain the same, regardless of the degree to which the access device is "off-track" (i.e., the amount the access device 10 runs off a track of the disk). Accordingly, the degree of off-track of the access device 10 is determined using at least two location signals, e.g., 20, 30, based differences between the two or more location signals.

Generally, embodiments of the present invention provide a disk for data storage and a disk storing device, which makes it possible to recognize a precise location of an access device using only one location signal.

According to an illustrative embodiment, a hard disk drive includes a magnetic head, at least one disk and a controller. A location signal is recorded on the at least one disk for determining a location of the magnetic head in relation to the at least one disk. The controller controls the location of the magnetic head based on the location signal decoded through the magnetic head. At least one of frequency and amplitude of the location signal is variable.

The location signal may be recorded to form verticality between a track line of the at least one disk and a processing direction of the location signal. In one alternative, the location signal may be recorded to form a slant line between a track line of the at least one disk and a processing direction of the location signal. The location signal may be recorded to be symmetrical with an adjacent location signal.

The location signal may be recorded to have periodicity corresponding to off-track positioning of the magnetic head. Also, the location signal may be included in a servo sector of a track in the at least one disk.

According to another illustrative embodiment, a disk for data storage includes a data sector in which data is recorded, and an information sector in which information is recorded for accessing the data sector. The information sector includes a variable location signal for recognizing a location of an access device configured to access the data recorded in the data sector.

The location signal may have a frequency and an amplitude, at least one of which is variable. The at least one of variable frequency and amplitude varies as a function of an off-track position of the access device.

According to another illustrative embodiment, a disk storing device includes the disk for data storage and an access device for accessing the disk for data storage using the variable location signal.

BRIEF DESCRIPTION OF THE DRAWINGS

The embodiments of the present invention will be described with reference to the attached drawings, in which.

DETAILED DESCRIPTION OF THE EMBODIMENTS

Figure 1:
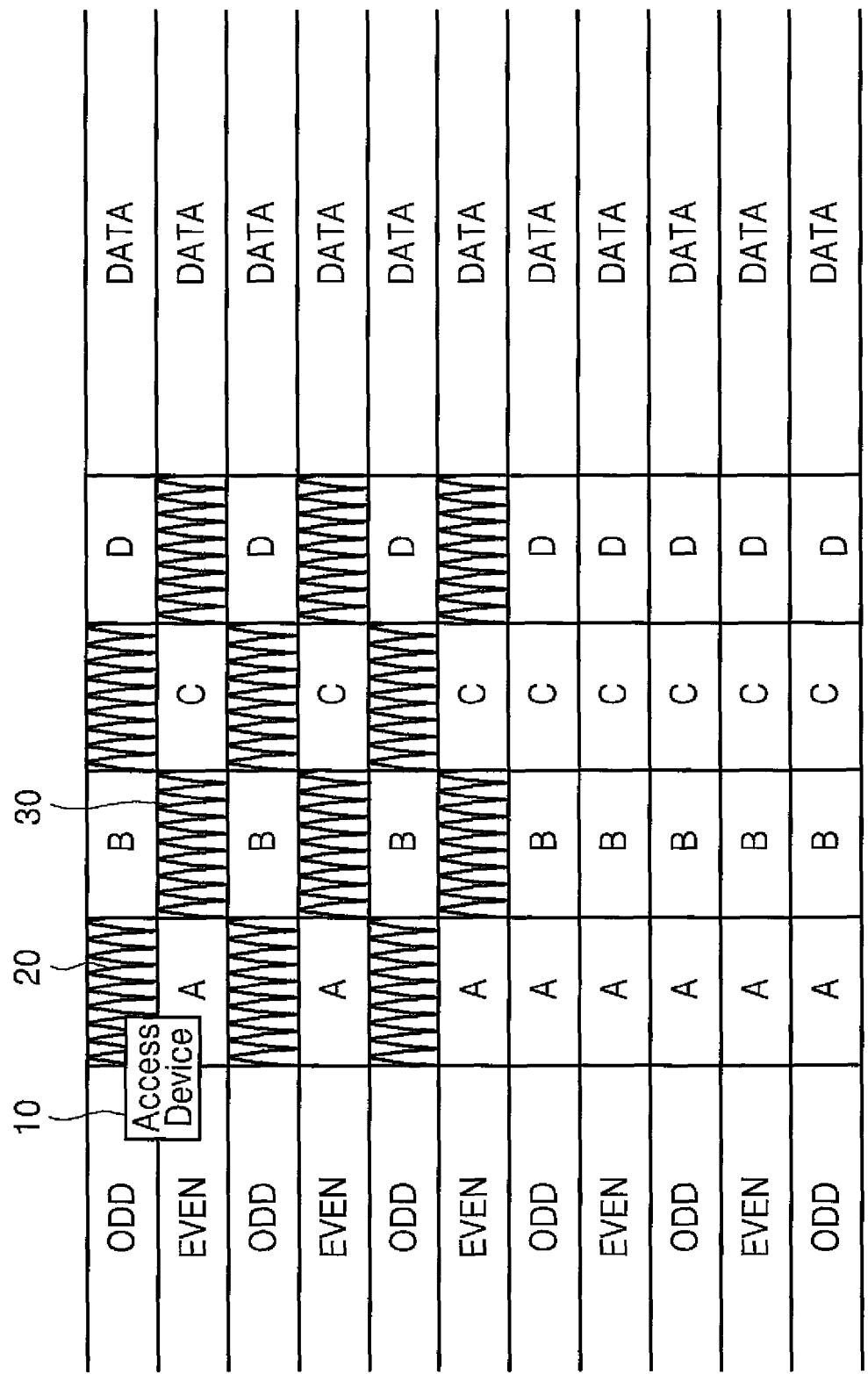
FIG. 1 is a schematic diagram showing structure of a location signal in a conventional disk storing device.

The present invention will now be described more fully with reference to the accompanying drawings, in which exemplary embodiments of the invention are shown. The invention, however, may be embodied in various different forms, and should not be construed as being limited only to the illustrated embodiments. Rather, these embodiments are provided as examples, to convey the concept of the invention to one skilled in the art. Accordingly, known processes, elements, and techniques are not described with respect to some of the embodiments of the present invention. Throughout the drawings and written description, like reference numerals will be used to refer to like or similar elements.

Figure 2:
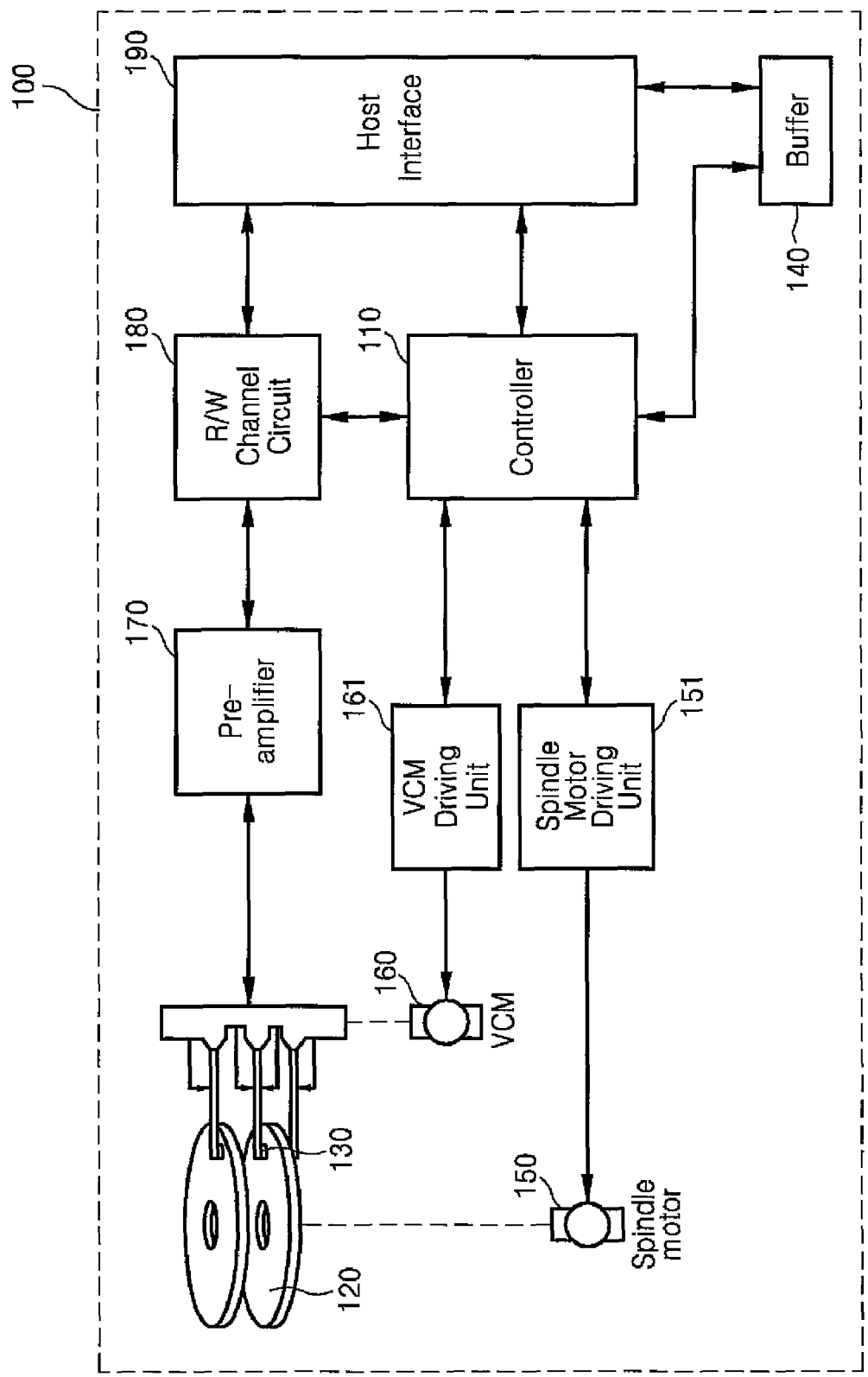
FIG. 2 is a functional block diagram of a hard disk drive, according to an illustrative embodiment of the present invention.

FIG. 2 is a functional block diagram of a disk storing device, such as a hard disk drive, according to an illustrative embodiment of the present invention. Referring to FIG. 2, hard disk drive 100 includes controller 110, at least one disk 120, and access device (e.g., magnetic head) 130. The hard disk drive 100 further includes additional elements enabling operation, such as buffer 140, spindle motor 150, spindle motor driving unit 151, voice coil motor (VCM) 160, VCM driving unit 161, an actuator (not shown), pre-amplifier 170, read/write R/W channel circuit 180, host interface 190, and a memory (not shown).

Embodiments of the present invention are not restricted to a bard disk drive, but may be incorporated in any type of disk storing device using a disk for data storage. The disk storing device may be one of various media devices and/or data storage devices, such as a camcorder, for example. However, various embodiments are described herein with reference to a hard disk drive as a representative disk storing device, for convenience of explanation.

The controller 110 performs controls necessary for driving the hard disk drive 100. For instance, to perform a data writing operation on the at least one disk 120, the controller 110 outputs data, which will be written through the R/W channel circuit 180 and the pre-amplifier 170 to the access device 130, and controls the location where the data is written on the at least one disk 120 by controlling the VCM 160 and the spindle motor 150 via the VCM driving unit 161 and the spindle motor driving unit 151, respectively. The controller 110 may require predetermined firmware to perform the various mentioned operations described herein. The firmware may be stored in the memory (not shown), e.g., a random access memory RAM or a flash memory, which is connected to the controller 110.

The controller 110 decodes a location signal to recognize the location of the access device 130 as described above. The location signal may be included, for example, in a servo sector of the at least one disk 120. The servo sector may further include data for an index, a sector and a cylinder. In an embodiment, one or both of the frequency and the amplitude of the location signal as recorded vary with respect to an amount or degree the access device 130 is off-track, with respect to a corresponding track of the at least one disk 120.

Location signals having variable frequency and/or amplitude, rather than conventional location signals having fixed frequency and amplitude, enable more efficient use of disk space. Also, in various embodiments, location signals recorded to have variable frequency and/or amplitude may be incorporated in a number of processes of a hard disk drive, such as a servo write operation, for example.

Figure 3:
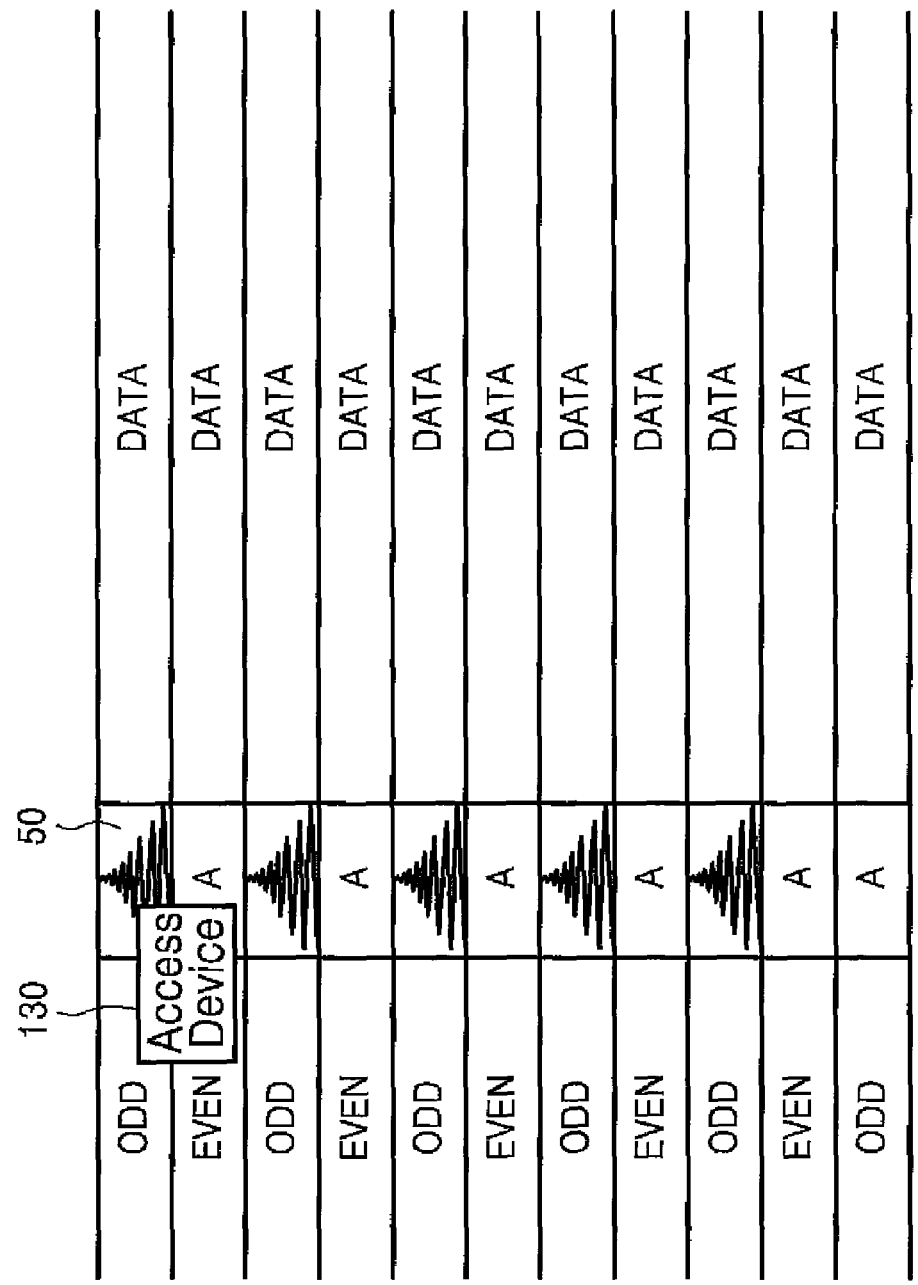
FIG. 3 is a schematic diagram showing control of a magnetic head by a location signal of a hard disk drive, according to an illustrative embodiment of the present invention.
Figure 4:
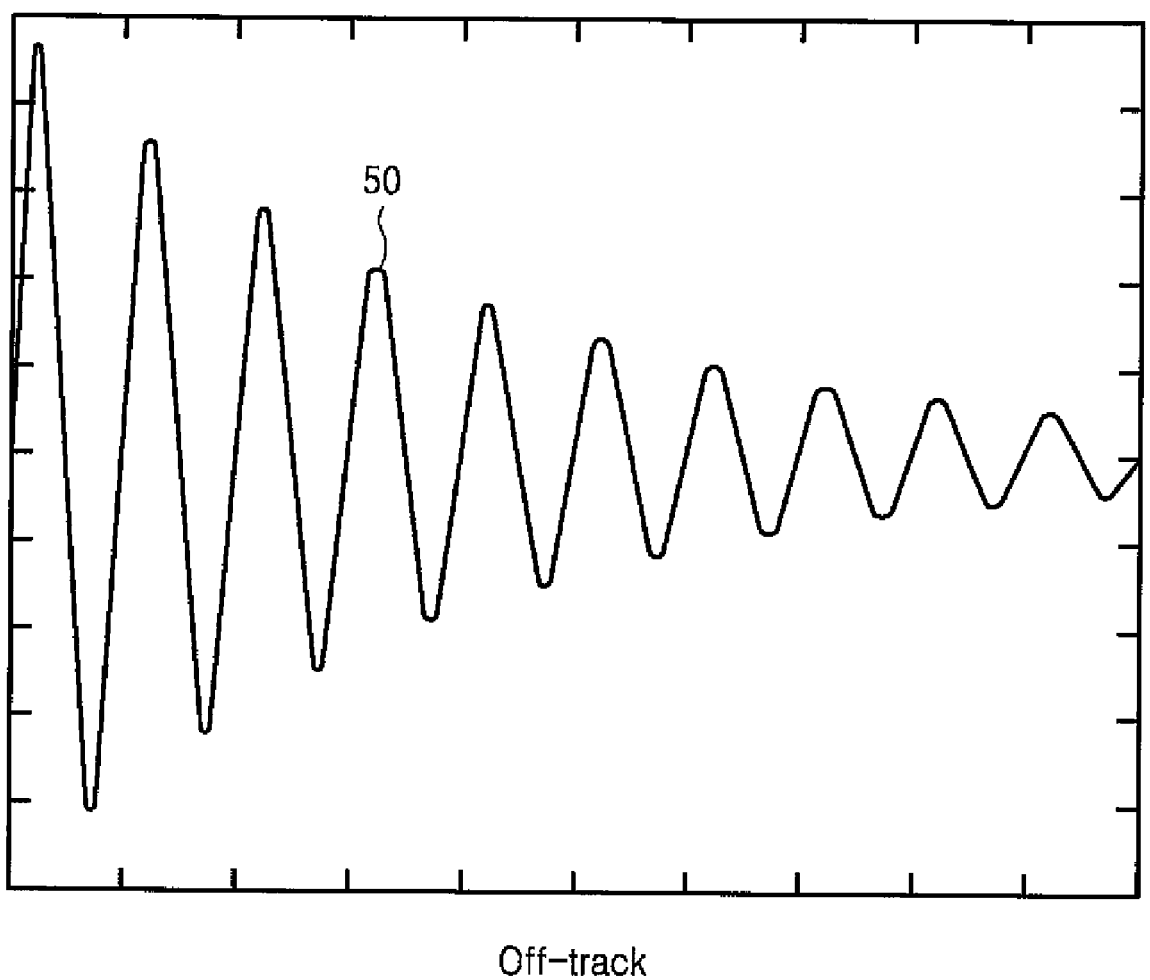
FIG. 4 is a graph showing characteristics of a location signal, according to an illustrative embodiment of the present invention.

FIG. 3 is a schematic diagram showing a representative location signal of a disk storing device, such as a hard disk drive for controlling of a magnetic head, according to an illustrative embodiment of the present invention. FIG. 4 is a graph showing characteristics of a location signal, according to an illustrative embodiment of the present invention.

Referring to FIGS. 2 to 4, location signal 50 of FIG. 3 may be recorded in a servo sector of hard disk drive 100, according to an illustrative embodiment of the present invention. In addition, as shown in FIG. 3, the location signal 50 may be recorded to form verticality with a concentric circle formed by the corresponding track of the at least one disk 120.

For example, forming verticality between the location signal 50 and the concentric circle of the track means that the processing direction of the location signal 50 is perpendicular (or substantially perpendicular) to a tangent line of the concentric circle. That is, forming verticality may include forming an angle of exactly 90 degrees or forming an angle of substantially 90 degrees, without departing from the scope of the embodiment. When the location signal 50 and the track of the at least one disk 120 cross at right angles, the oscillation direction of the location signal 50 may be used to reflect the degree of off-track of the access device 130, as illustrated in FIG. 3. Also, in the depicted embodiment, at least one of frequency and/or amplitude of the location signal 50 may decrease in accordance with the degree of off-track of the access device 130, as illustrated in FIG. 4.

Figure 5:
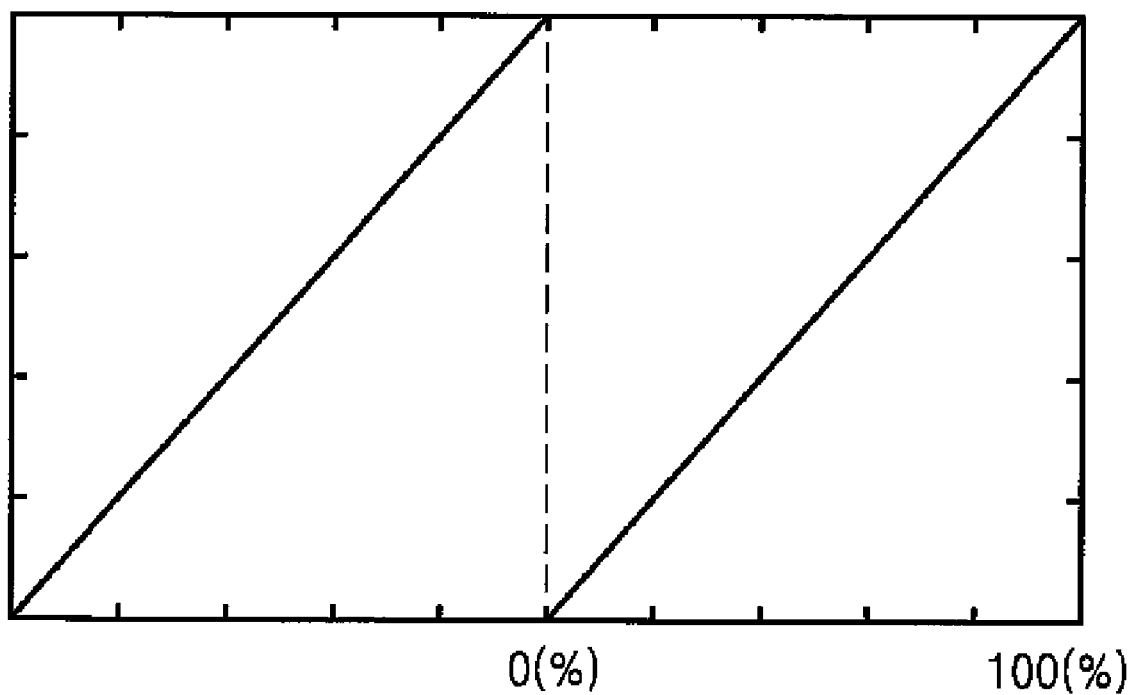
FIG. 5 is a graph showing periodicity of a location signal, according to an illustrative embodiment of the present invention.

FIG. 5 is a graph showing periodicity of a location signal according to an amount of off-track of a magnetic head of a hard disk drive, according to an illustrative embodiment of the present invention. Using the representative location signal 50 illustrated in FIG. 4, for example, a ratio of amplitude to frequency has a fixed cycle (or period), according to the degree of off-track of the access device 130.

Amplitude and/or frequency are decoded (or detected) differently. Therefore, even when only one location signal 50 is used, the controller 110 may decode precisely the location of the access device 130 with respect to a track on the at least one disk 120 based on the decoded amplitude and/or frequency.

As discussed above, since precise location control of the access device 130 with respect to a track is possible using one location signal, disk space is used more efficiently and the domain for storing actual data increases, according to embodiments of the present invention. In addition, it is easy to search for a track, as well as to follow a track by having a fixed periodic ratio of amplitude to frequency.

Figure 6:
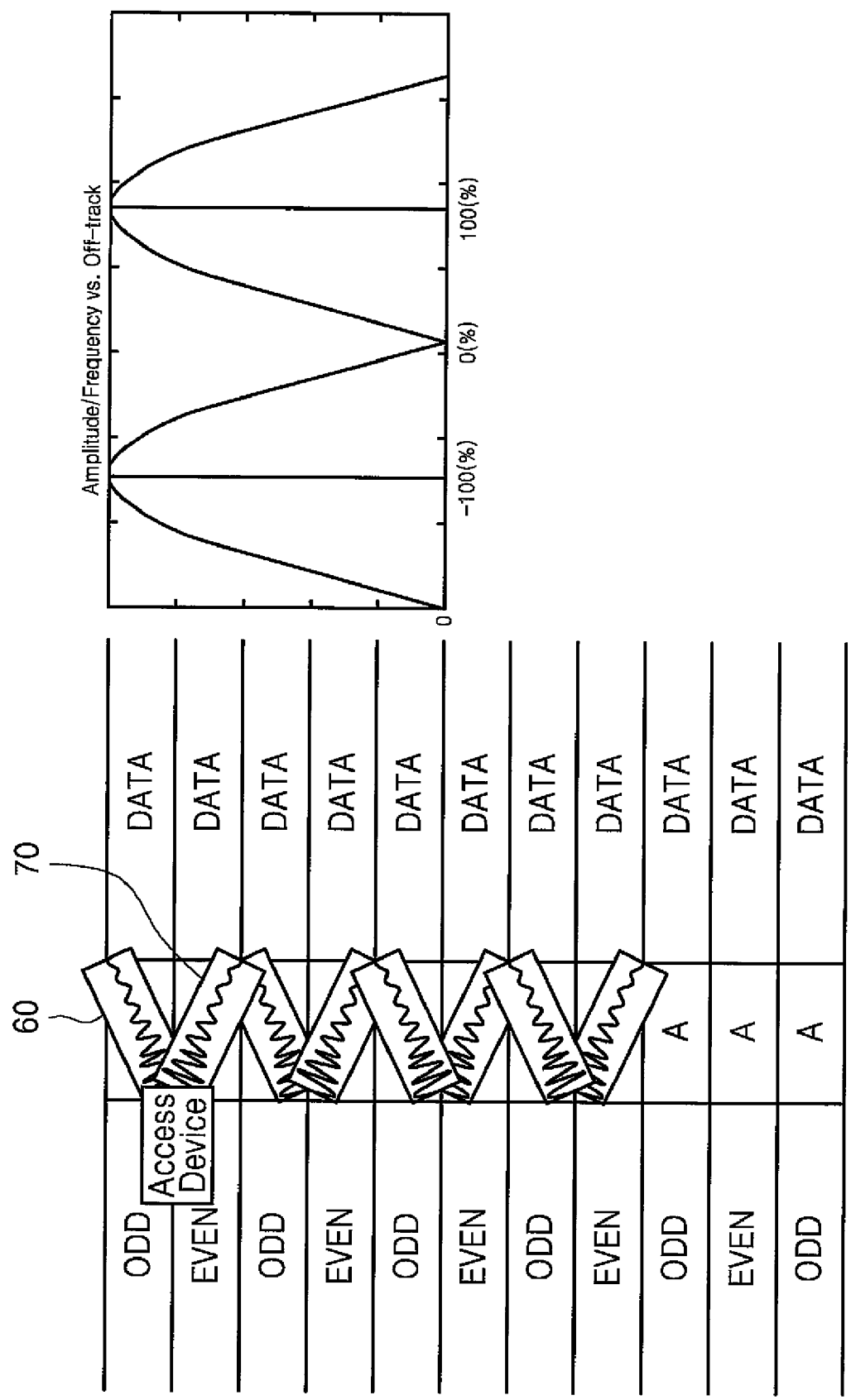
FIG. 6 is a schematic diagram showing characteristics of a location signal and a graph showing periodicity of the location signal, according to another illustrative embodiment of the present invention.

FIG. 6 is a schematic diagram showing characteristics of a location signal, according to an illustrative embodiment of the present invention, and a graph showing periodicity of the location signal according to off-track of an access device (e.g., magnetic head).

Referring to FIG. 6, location signal 60 is recorded at an angle, such that the track of the at least one disk 120 and the processing direction of the location signal 60 form a slant line (e.g., between 0 and 90 degrees). That is, the location signal 60 may be recorded so that it slants diagonally with respect to a tangent line of a concentric circle defined by the track, as illustrated in FIG. 6.

For instance, the location signal 60 included in a first track of FIG. 6 has a processing direction that forms a predetermined angle with the line made by the track of the at least one disk 120. Additionally, location signal 70 adjacent to the location signal 60 forms the same predetermined angle (in the opposite direction) with the track line located between the location signal 60 and the location signal 70. In other words, the location signal 60 and the location signal 70 are recorded symmetrically around the track line.

By recording in this manner, the frequency and/or amplitude of each location signal 60 and 70 has a fixed period according to the degree of off-track of the access device 130. Thus, the ratio of amplitude to frequency according to the degree of off-track has periodicity, as illustrated in the graph of FIG. 6.

As stated above, the various embodiments of the present invention may be applied to different types of disk storing devices using a disk for data storage, such as a hard disk drive. The disk includes at least a data sector, in which data is recorded, and an information sector, e.g., corresponding to a servo sector, in which information is recorded for accessing the data sector. The information sector includes a location signal for recognizing a location of an access device, e.g., corresponding to a magnetic head, accessing the data sector. In addition, at least one of the frequency and amplitude of the location signal varies with respect to off-track of the access device. A disk storing device and a disk for data storage according to embodiments of the present invention improve efficient use of disk space, since accurate location control of an access device is performed using one location signal.

The disk storing device may be used in conjunction with any of a variety of data processing devices that include storing and decoding data using a disk, as well as various media devices, such as camcorders, for example.

While the present invention has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A hard disk drive comprising:
   a magnetic head;
   at least one disk on which a location signal is recorded for determining a location of the magnetic head in relation to the at least one disk; and
   a controller for controlling the location of the magnetic head based on the location signal decoded through the magnetic head,
   wherein at least one of frequency and amplitude of the location signal is variable.

2. The hard disk drive of claim 1, wherein the location signal is recorded to form verticality between a track line of the at least one disk and a processing direction of the location signal.

3. The hard disk drive of claim 1, wherein the location signal is recorded to form a slant line between a track line of the at least one disk and a processing direction of the location signal.

4. The hard disk drive of claim 3, wherein the location signal is recorded to be symmetrical with an adjacent location signal.

5. The hard disk drive of claim 1, wherein the location signal is recorded to have periodicity corresponding to off-track positioning of the magnetic head.

6. The hard disk drive of claim 1, wherein the location signal is included in a servo sector of a track in the at least one disk.

7. A disk for data storage, the disk comprising:
   a data sector in which data is recorded; and
   an information sector in which information is recorded for accessing the data sector, the information sector including a variable location signal for recognizing a location of an access device configured to access the data recorded in the data sector.

8. The disk of claim 7, wherein the variable location signal has a frequency and an amplitude, at least one of which is variable.

9. The disk of claim 8, wherein the at least one of variable frequency and amplitude varies as a function of an off-track position of the access device.

10. A disk storing device comprising:
    the disk of claim 7; and
    the access device for accessing the disk for data storage using the variable location signal.

\* \* \* \* \*